Feb. 16, 1926.
W. T. JAMES
1,573,247
SCOOTER
Filed Jan. 14, 1925
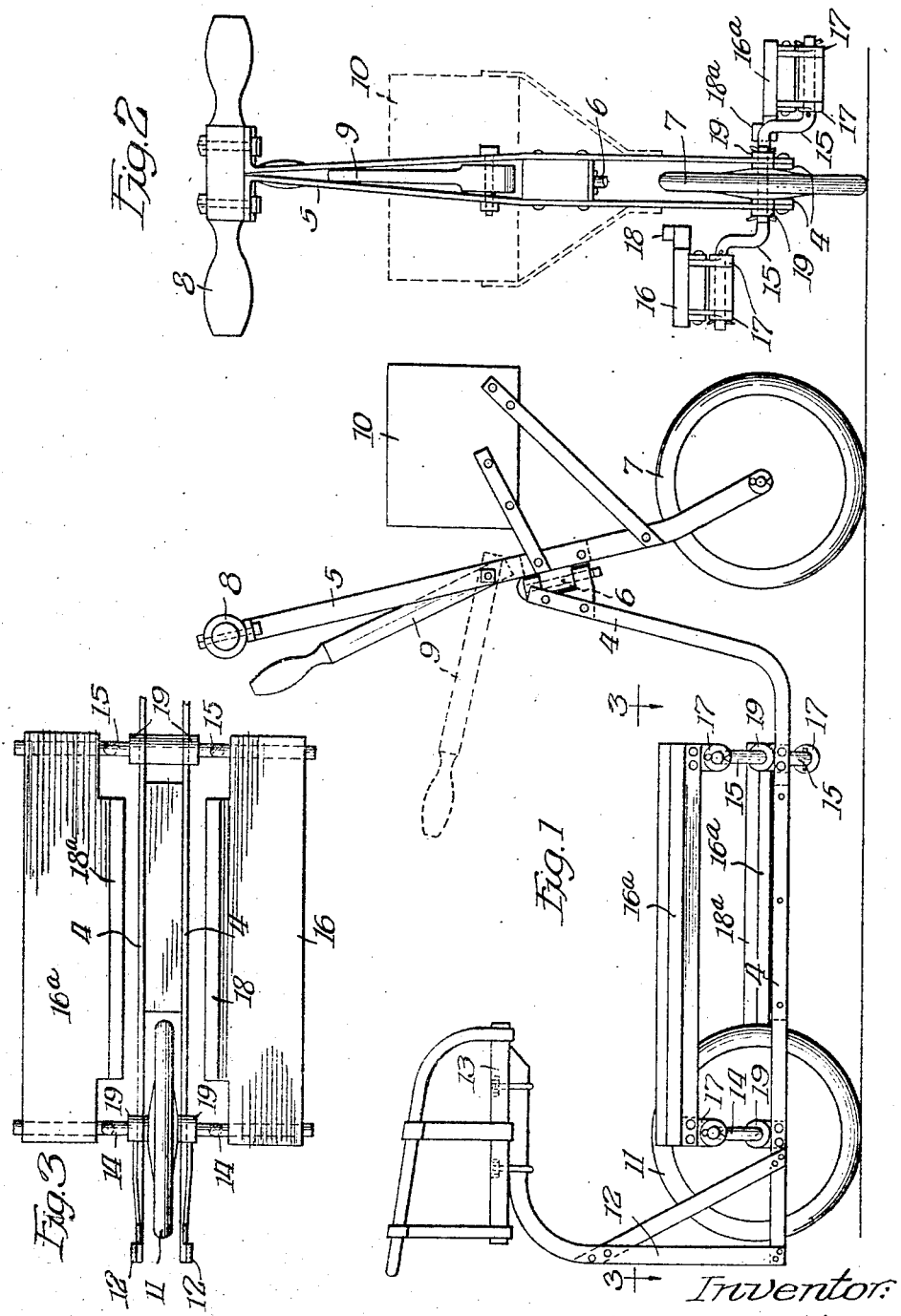
Inventor:
William T. James Patented Feb. 16, 1926.

1,573,247

UNITED STATES PATENT OFFICE.

WILLIAM T. JAMES, OF CHICAGO, ILLINOIS.

SCOOTER.

Application filed January 14, 1925. Serial No. 2,323.

*To all whom it may concern:*

Be it known that I, WILLIAM T. JAMES, a citizen of the United States, and a resident of Chicago, in the State of Illinois, have invented certain new and useful Improvements in Scooters, of which the following is a specification.

My present invention relates in general to a form of play vehicle used for exercise having wheels located tandem to each other, a platform between the wheels for supporting the rider on one foot, the other foot pushing the wheel along the line of movement of which the following is a specification, reference being had therein to the accompanying drawings.

The principal object of my present invention are the provision of improved means for propelling the vehicle to attain the same object of exercise with more ease, a uniform motion of both feet, to attain movement either standing or sitting, to use this type of vehicle as a useful carrier of objects to be moved, to be able to move faster with the same expenditure of energy and generally to improve the service and construction of vehicles, together with such further objects as will hereinafter appear.

In attaining the foregoing objects and certain additional advantages to be below disclosed, I have provided the construction illustrated in the accompanying drawings wherein:—

Figure 1 is a longitudinal side elevation of the chassis or supporting frame with one platform pedal at the high position, the stationary handle at the top for steering when standing up, the seat for the operator to sit on when operated from a sitting position with the pivoted handle for the purpose of steering when seated shown in dotted lines, one wheel on the center of the crank shaft, one wheel on the lower end of inclined steering column and a crank shaft located apart from wheel to support pedal platform extending between two crank shafts.

Figure 2 is an elevation of inclined steering column, two pedals in end views opposite to each other in revolving positions one up and one down on crank shaft supporting pedal platforms, rigid cross bar handle at top for steering when standing up and end view of pivoted handle for steering when operator is seated.

Figure 3 is a plan view of pedal platforms extending between and supported at each end on crank shafts and located on each side of supporting frame and wheel.

Referring to the drawings the frame is made of two side members bent to connect with and attach by a pivoted joint to inclined steering column for turning the wheel in the steering column to vary the direction of vehicle travel, provided with two crank shafts one carrying a wheel and one located to register with the crank shaft in wheel and a platform extending between the respective cranks on each side of wheel comprising two platforms one on each side of frame for revolving the wheel by operation of the platforms in unison on their respective sides of frame and opposite to each other on opposite sides of frame. The frame is provided with seat and pivoted handle and a package carrier around and in front of steering column.

Referring now to the characters on the drawing, 4 are the side frames extended one end to form a pivoted connection with the steering column 5, 6 is the pivot pin in column 5 connecting frame 4, 7 is the steering wheel and 8 the stationary steering handle on 5, 9 is the pivoted steering handle, 10 is a package carrier supported by frame 4, 11 is the driving wheel, 12 is the supporting structure for seat 13, 14 is crank shaft in wheel 11, 15 is crank shaft supporting platforms 16 and 16ᴬ extending to crank 14, and 17 are bearing connections between cranks 14—15 and platforms 16—16ᴬ, 18 and 18ᴬ are raised edges along the platforms, 19 are bearing connections between side frames 4 and crank shafts 14 and 15.

It will be seen that when the platform 16 is pressed down that the cranks 15 and 14 will revolve wheel 11 propelling the vehicle and that platform 16ᴬ will move up and the operation will be repeated on opposite sides to propel the vehicle the same as with a single crank in a wheel revolved by pedals. The pivoted handle 9 is provided to make an easy means of steering in a seated position. The carrier 10 may be supported on the frame or the steering column. Suitable means may be provided to secure handle 9 in an upright or downward position.

Having thus described my invention and illustrated its use, what I claim as new and desire to secure by Letters Patent is:

1. A two-wheel vehicle having two substantially horizontal supporting side bars with one end bent upward, and having a platform between said side bars, said side bars supported by a wheel at one end, and by a pivoted joint at the bent end, two crank shafts with journaled bearings adapted to revolve on the said side bar frame structure, the said supporting wheel located on one of said crank shafts between the said side bars, and said crank shaft connected to the other crank shaft by a connecting pedal platform having an uniform motion at both ends, and the said connecting platform adapted to impart motion to revolve the wheel on the crank shaft, when the two crank shafts are revolved together by the said platform.

2. A vehicle having two wheels, a longitudinal platform frame structure substantially horizontal with two side bars bent at one end, and supported at one end by one of said wheels, and by a pivoted joint connection in a steering-column at the other end, the other of said wheels supported by the said steering-column, two crank shafts journaled in the said platform with side bar frame structure, one of said wheels on one of said crank shafts, and two pedal platforms connecting the two said crank shafts one on each side of said frame structure, and said platforms adapted to have a uniform motion at both ends to revolve said crank shafts in unison to propel the vehicle.

3. A vehicle having a substantially horizontal frame, two wheels, two double end cranks with connecting platforms adapted to revolve one of said wheels, a pivoted steering post on one end of said horizontal frame, and a receptacle attached to the side frame structure of said steering post to hold articles to be carried by the said vehicle substantially as described.

4. A vehicle having a substantially horizontal frame, two wheels, two double end cranks, two platforms connected to the said cranks, a pivoted steering post, and a pivoted hinged handle in the central portion of said steering post adapted to revolve the steering post to turn one of said wheels sidewise substantially as described.

WILLIAM T. JAMES.